INVENTOR
Forbes G. deB. Perry

Watson, Cole, Grindle & Watson
ATTORNEYS

United States Patent Office 3,153,938
Patented Oct. 27, 1964

3,153,938
CONTINUOUS INFINITELY VARIABLE
TRANSMISSION
Forbes George de Brie Perry, Felbridge, East Grinstead,
England, assignor to National Research Development
Corporation, London, England, a British body
corporate
Filed May 16, 1961, Ser. No. 110,572
Claims priority, application Great Britain May 18, 1960
23 Claims (Cl. 74—200)

This invention relates to a continuously variable ratio transmission of the type in which a plurality of rollers transmit the drive from one to another of two disc like members mounted to rotate independently and co-axially, one being a driving member and the other a driven member. The opposed surfaces of the discs with which the rollers make contact form part of a torus having a circular generator rotating about the axis of the discs. Ratio changes are brought about by changing the angle which the rotational axis of each roller bears to the rotational axis of the discs whereby at one extreme position of the roller axes, each roller is engaging a surface of the driving disc at a relatively small diameter and the surface of the driven disc at a relatively large diameter to provide a "low" transmission ratio (i.e. one in which the angular velocity of the driving member is greater than that of the driven member) and in the other extreme position each roller is engaging the driving disc at a relatively large diameter and the driven disc at a relatively small diameter to give a high transmission ratio (i.e. a ratio at which the angular velocity of the driving member is lower than the angular velocity of the driven member). At intermediate angles of the roller axes various ratios, including a 1:1 ratio when the roller axis is normal to the disc rotational axis, are provided. The angle which a roller axis bears to the rotational axis of the discs will be hereinafter referred to as the "ratio angle."

In some transmissions of this type changes of ratio angle are brought about by directly altering the ratio angles of the roller shafts but preferably the rollers are caused to run along helical paths from one ratio angle to another by mounting the rollers in carriers which are bodily tilted in planes substantially parallel to the plane of the circle representing the locus (hereinafter called the torus centre circle) of the centre of the torus generator. The angle which a datum line on the roller carrier running through the centre of the roller and lying substantially in the plane of the torus centre circle, bears to the radial line passing through the centre of the roller and the rotational axis of the discs, is hereinafter referred to as the "tilt angle." It is this particular type of continuously variable ratio transmission to which the invention relates and it will hereinafter be referred to as a transmission of the type described.

A roller will be in stable equilibrium at a certain ratio angle only so long as its rotational axis intersects the rotational axis of the discs.

When a tilt angle change is imparted to a roller carrier, the rotational axis of the roller is displaced so that it no longer intersects the rotational axis of the discs. The roller will then steer itself to a different ratio angle and will continue to do so unless and until, in the course of changing ratio angle its axis is again caused to intersect the disc axis.

Two basic methods of bringing this about may be cited.

According to the first method (hereinafter called the "camber angle" method) the actual plane in which tilt angle changes take place is not exactly in the plane of the torus centre circle but is inclined thereto by a small angle hereinafter called the "camber angle" which is measured in a plane tangential to the torus centre circle and parallel to the rotational axis of the discs and containing the centre of the roller. This type of geometry produces the desired result because when, due to a change of tilt angle the rotational axis of a roller when produced towards the rotational axis of the discs no longer intersects the rotational axis of the discs, the roller in steering itself into a different ratio angle causes its rotational axis, due to the camber angle, to move back towards a position at which when produced it again intersects the rotational axis of the discs and the rollers will again be in stable equilibrium at a changed ratio angle.

According to the second method (hereinafter called the "tilt cancelling" method), the roller carrier mounting is such that, when the roller changes its ratio angle in response to application of a tilt angle change, the ratio angle change alters the relationship between the roller carrier and the control linkage through which the tilt angle change was applied so as to cancel out the tilt angle change, the roller carrier reverting to the neutral tilt angle position but at a changed ratio angle at which it is in stable equilibrium.

With both methods, some parts of the control linkage through which tilt angle changes are applied to a roller carrier, which are remote from the roller carrier, remain displaced when the new ratio angle has been taken up by the roller, but in the first method the parts of the linkage nearest to the roller carriage (and indeed the whole of the linkage) also remain displaced whereas with the second method the roller carrier and sometimes also parts of the linkage nearest to the roller carrier revert to the neutral tilt angle position and an intermediate part of the linkage undergoes a change dependent upon the change of the ratio angle.

It will assist towards an understanding of the invention to consider one known transmission of the type described (being an example of the "camber angle" method) which transmission is described and illustrated in United States Patent No. 2,140,012. In this transmission the roller carriers extend in both directions from the roller centre in the plane of the torus centre circle and terminate in ball ends which are mounted in rockers pivoted on fixed pivots anchored to a fixed reaction plate lying between the two discs.

Each rocker has two sockets facing outwardly from its pivot which respectively engage the ball ends of two adjacent roller carriers and each rocker has an integral inwardly extending arm terminating in a control tip which engages an individual control point on a common control member which takes the form of a cam ring carried by a control sleeve which is rotatable about the rotational axis of the discs, the control points engaged by the rocker arms being equally spaced around the periphery of the cam ring. A lever or the like extends from the control sleeve outside the transmission and may be moved to rotate the control sleeve with the cam ring so as to swing the rockers about their pivots. In this particular arrangement the rocker arm pivots are located on a pitch circle such that the line of thrust imparted to the roller carriers by the torque reaction, which is substantially tangential to the torus centre circle, passes outside the rocker pivots. The motion imparted to the roller carriers through the rockers when the cam ring is rotated by means of the control sleeve, is such that changes of tilt angle are produced predominantly about axes parallel to the rotational axis of the discs and passing through the roller centres but there is also a component of motion of the roller carriers bodily in directions tangential to the torus centre circle and this while augmenting to a small extent the change of tilt angle, also enables a torque reaction force to be applied via the rocker arms to the cam ring and via the control sleeve to the operating lever. The control lever is thus acted upon by a force dependent on the torque reaction in a direction tending to lower the transmission ratio. This facilitates the use of a control system for the transmission which is torque sensitive.

Small dimensional inequalities between the rollers and their carriers and control linkages tend to produce differences in the loads carried by the various rollers and as they are all rigidly coupled together as to their tilt angles via the rocker arms and the cam ring, these inequalities will persist. In order to enable the transmission load to be equally shared between the rollers it has been proposed to provide a limited amount of clearance in the mounting of the cam ring so that it can shift laterally to a limited extent in any direction radial of the discs. When one roller is carrying a greater part of the transmission load than the other rollers, the rocker arm against which this roller bears will be displaced and since the rotational position of the cam ring is locked by the control lever, the cam ring will shift radially of the discs in a direction substantially at right angles to the radial line passing through the rocker pivot axis and the disc axis. This causes a load equalisation movement of the rockers controlling the other rollers so that they tend to move into a higher ratio whilst the hitherto overloaded roller by virtue of the motion of the rocker initiating the equalisation action, tends to move to a lower ratio. When the rollers are all bearing equal loads the cam ring takes up an equilibrium position displaced from its nominal centre.

Whilst the arrangement above described provides adequate automatic load equalisation for many purposes, the equalisation is imperfect and this is believed to arise from the fact that each of the rockers partakes in the control of two adjacent rollers so that the underloaded rollers are readjusted along two channels, one via the cam ring and the rocker against which the roller in question is urged by torque reaction and the other via the cup of a rocker which is in contact with the roller carrier of the overloaded roller so that the underloaded rollers do not undergo correct load equalisation movements. This can lead to a circulating transference of overload from one roller to another and in extreme cases the circulating overload may build up to a magnitude sufficient to cause the transmission system as a whole to slip whereupon it ceases to transmit the drive.

A further cause of malfunction is inherent in the geometry of this particular design in that the tips of two adjacent rocker arms respectively engaging the ball ends of a roller carrier, move in divergent arcs so that the distance between them varies over the range of control motion. This distance is therefore greater than that between the ball ends of the roller carrier except at one point in the range, permitting substantial end float of the roller carrier at other points in the range. This is not of great significance when the torque is in the normal direction (e.g. from prime mover to load) but the abrupt changeover on a reversal of torque causes significant changes in the relative attitudes of the rollers which may cause damage before equalisation measures can provide corrections. This is particularly the case where there are rapid alternations in the direction of the torque.

According to one aspect of the invention there is provided a transmission comprising a pair of facing toroidal discs carried respectively on a pair of shafts and being drivably connected by a plurality of rollers carried respectively for rotation on spindles or the like by a plurality of independent roller carriers characterised in that the roller carriers are mounted respectively on a plurality of mountings which are independent of each other and which are connected to a common thrust receiving member capable of allowing asymmetrical movements of the mountings relative to one another.

The phrase "asymmetrical movement of the mountings" is used in the sense of movements on the part of all roller carrier mountings which are not in the same sense nor to the same degree.

According to another aspect of the invention there is provided a transmission of the type described having a roller carrier for each roller of a set of rollers in driving engagement between a single surface on a driving disc and a single surface on a driven disc, a mounting for each roller carrier which mounting is capable of motion resulting in bodily movement of the associated roller carrier, such bodily movement having a substantial component in a direction tangential to the torus centre circle and resulting in tilt angle changes of the roller carrier, a common thrust receiving member and a coupling between the same and each roller carrier mounting the said member being adapted to support torque reaction forces acting upon the rollers but being capable, in response to unequal torque reaction forces applied to it by the roller carrier mountings of motion in a mode permitting each roller carrier in respect of which there is a difference between the torque reaction force acting thereon and the mean value of the torque reaction forces acting on all the roller carriers, consequent upon bodily movement as aforesaid to execute a tilt angle change such as to initiate a ratio angle change in the sense tending to reduce the said difference, the sole path for the transmission of bodily movement as aforesaid of any one roller carrier to any other roller carrier being the path through the mounting of that one roller carrier, the common thrust receiving member, and the mounting of that other roller carrier.

The transmission may be provided with adjustment means for the common thrust receiving member whereby it can be moved in a mode resulting in bodily motions as aforesaid of all the roller carriers in the same sense and to substantially the same degree. In this arrangement the common control member and the common thrust receiving member are one and the same member, and this member is capable of two modes of motion for ratio control and load equalisation respectively.

According to another aspect of the invention there is provided a transmission of the type described in which the roller carriers have independent mountings through which the torque reaction forces acting on each roller are individually referred to a separate connection point on a common thrust receiving member capable of limited movement in a mode permitting tilt angle changes of the rollers to take place, the tilt angle change in respect of that roller for which the said forces are greatest being in a sense such as to lower the transmission ratio and, in the case where the said forces acting on the other rollers are equal, the tilt angle changes in respect of two other rollers being in the opposite sense.

The tilt angle control of each roller may be applied at one end only of the roller carrier and may take the form predominantly of a bodily motion of the roller carrier in a direction tangential to the torus centre circle. The other end of the carrier may be supported in sliding engagement with a fixed guide arranged to permit ratio angle rotation of the roller carrier, e.g. a part spherical projection on the roller carrier sliding in a tubular socket fixed to the reaction plate.

A number of embodiments of the invention will now be described by way of example with reference to the accompanying drawings, in which.

In all the embodiments hereinafter described, those parts of the embodiments which are not specifically described and illustrated may be similar to corresponding parts described and illustrated in United States Patent No. 2,140,012 to F. A. Hayes.

Figures 1, 2:
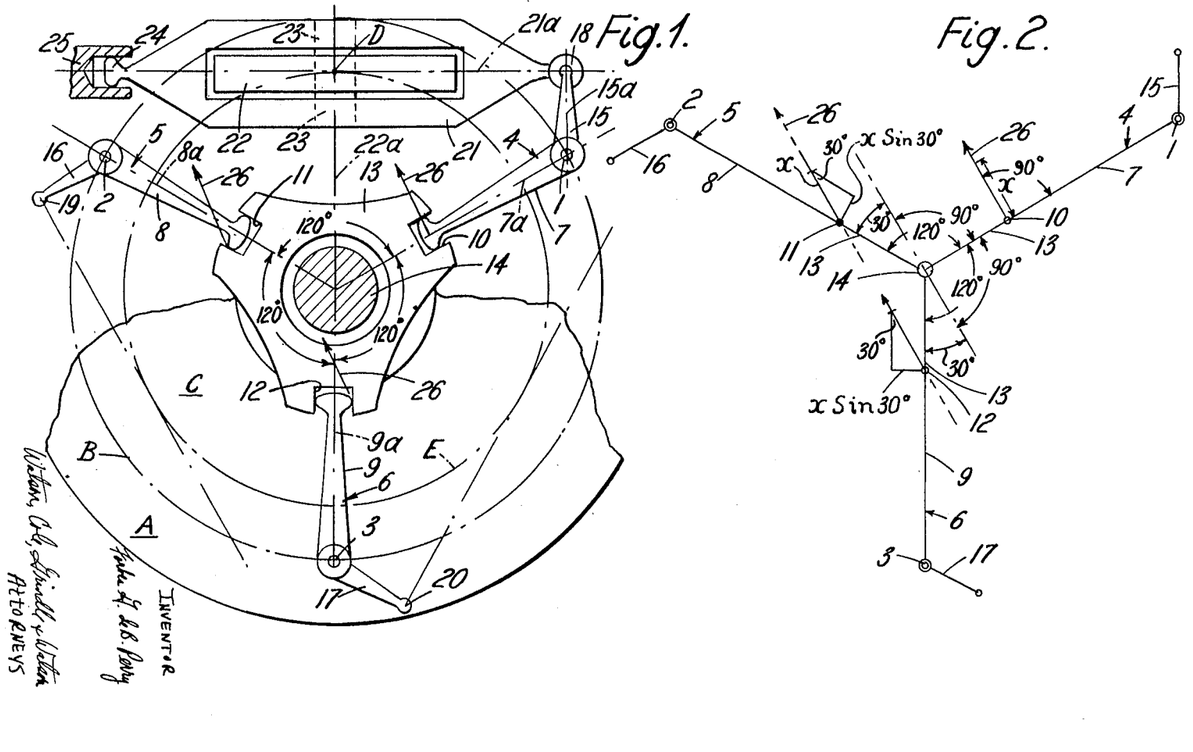
FIGURE 1 is a diagrammatic representation of the roller carrier mechanism of a transmission of the invention.
FIGURE 2 is a diagram representing the geometry of FIGURE 1.

Referring now to the drawings the diagram of FIGURE 1 relates to an arrangement having three rollers disposed equally around the toroidal disc tracks. The lower diagram of FIGURE 1 represents a view of the roller mounting as seen when looking in the direction of the driven disc A from the direction of the driving disc which is removed for clarity. In this embodiment the driving disc rotates in a clockwise direction and the driven disc A rotates in an anti-clockwise direction. The torque reaction imparted to roller carrier mountings acts in a clockwise direction i.e. the same direction as the direction of rotation of the driving disc.

In any practical transmission of the type described, at least three rollers disposed around the toroidal disc tracks are provided and though it is theoretically possible to use more than three rollers it is kinematically undesirable to do so.

Three rocker pivots 1, 2 and 3 are equally spaced around a pitch circle B centered on the disc rotational axis C and anchored to a fixed reaction plate (not shown) between the discs. Cranked rockers 4, 5 and 6 are mounted on pivots 1, 2 and 3. These rockers have inwardly extending arms 7, 8 and 9 which engage recesses 10, 11 and 12 in a common control member which takes the form of a cam ring 13 mounted for rotation coaxially with the central main shaft 14 of the transmission. There is a radial clearance between the cam ring 13 and the shaft 14 allowing radial freedom of the cam ring 13 about the shaft 14. Outwardly extending arms 15, 16 and 17 of rockers 4, 5 and 6 terminate in swivelling joints 18, 19 and 20 which support respectively one end of each of the roller carriers.

Only one of the roller carriers 21, is shown in the drawing, the other two being indicated diagrammatically by chain dotted lines. Roller carrier 21 is slotted to receive roller 22 and has bearings to receive the roller axle 23 about which the roller 22 rotates relative to the roller carrier 21.

The end of roller carrier 21 remote from swivelling joint 18 is machined to the form of a plug 24 which rides in a socket 25 anchored to the reaction plate.

Control movements are executed by the cam ring 13 which rotates about shaft 14 for this purpose. When in its chosen rotational position however, the cam ring 13 is anchored against rotational movement via a control sleeve and control system (not shown). Because of its limited radial freedom however, the cam ring 13 can shift laterally.

For a given rotational movement of the cam ring 13, the rocker arms 7, 8 and 9 make equal movements about pivots 1, 2 and 3. The result of these movements will be explained in relation to rocker 4. Arm 15 of rocker 4 has its centre-line 15a substantially normal to the centre line 21a through roller carrier 21. (This latter centre line 21a may be defined as the line passing through the pivotal centre of swivelling joint 18 and the centre D of roller 22. The centre D of roller 22, which is difficult to determine in practice, is the intersection with the rotational axis 22a of the roller 22, of the plane in which lies the centre line of the disc-contacting track which line in turn depends upon the form of the roller periphery and the diameter of the part of the toroidal track on the disc with which it is making contact.) For small movements of rocker 4, therefore, the roller carrier 21 will move along a line tangential to the torus centre circle E. In a predetermined central position the roller carrier centre line 21a will be normal to the radial line passing through the rotational axis C of the discs and the roller centre D. There will then be zero tilt angle and the roller 22 will have a ratio angle giving a 1:1 transmission ratio.

When the roller carrier 21 shifts tangentially of the torus centre circle E on movement of rocker 4, a change of tilt angle takes place as the roller carrier centre line 21a is no longer normal to a radial line passing through the disc axis C and the roller centre D. A shift to the right, of carrier 21 as seen in FIGURE 1, causes the roller 22 to steer itself towards a ratio angle giving a lower transmission ratio and vice versa for a shift to the left of carrier 21.

As stated above, the torque reaction acting upon roller 22 tends to force the carrier 21 to the right. If all the rollers are sharing the torque equally the resulting forces at the inner ends of the arms 7, 8 and 9 will be symmetrical about the disc axis C and will tend to rotate the cam ring 13 in an anti-clockwise direction. If, however, one of the rollers—say roller 22—is carrying more of the load than the other two the forces applied to cam ring 13 will not be symmetrical about the disc axis C. The cam ring 13 is anchored in a chosen rotational position as described above via the control sleeve and the control system and it cannot, therefore, rotate in response to the unbalance of the forces applied to the recesses 10, 11 and 12. The limited radial freedom of cam ring 13 does, however, permit it to shift laterally and, provided that the other two rollers are equally loaded, it will do this (where roller 22 is the overloaded roller) is the direction normal to the line 7a passing through pivot 1 and the inner end of arm 7, as indicated by the arrows 26. With three control points equally spaced around the cam ring 13 the direction of shift of the cam ring 13 will lie at an angle of 30° to the centre lines 8a and 9a of the two other rocker arms 8 and 9 and if the distance moved by the cam ring is represented by x, the lateral movement of the inner ends of arms 8 and 9 will be equal to $$x \sin 30° \left( = \frac{x}{2} \right)$$

in each case and will be in the opposite sense about its pivot to the lateral movement of arm 7. The two equally underloaded rollers will, therefore, move towards higher ratio angles which will tend to increase their shares of the load and cam ring 13 will take up an equilibrium position, laterally displaced from its nominal centre position, and such that the rollers all take equal shares of the transmission load.

FIGURE 2 is a diagram illustrating the geometry of this load equalisation effect.

The same reference numerals have been used in FIGURES 1 and 2, for corresponding items. Cam ring 13 is shown as three radial lines at 120° to one another. Control point 10 is displaced a distance x in a direction at 90° to rocker arm 7 in the position it occupies when points 1 and 10 are in line with the disc rotational centre 14. The whole of cam ring 13 is displaced in this same direction. In the case of rocker arm 8, this displacement direction is at 120°—90°=30° to the line joining points 2, 11 and 14. In the case of rocker arm 9, this displacement direction is also at 120°—90°=30° to the line joining points 3, 12 and 144. The inner tips of arms 8 and 9 are, therefore, displaced by an amount $$x \sin 30° = \frac{x}{2}$$

in directions normal to the lines by which they are represented in FIGURE 2. The fact that the inner tips of rocker arms 8 and 9 follow an arc of a circle and not a straight line causes a theoretical departure from perfect load equalisation balance but as the motions are in practice very small the error represents a second order effect and can be ignored. It must be realised, of course, that the loads on the two underloaded rollers will not necessarily be equal so that the cam ring will not in such a case move in the direction of arrow 26 but in an intermediate direction dependent upon the resultant of three unequal forces each acting in a direction normal to the centre line of one of the rocker arms 7, 8 or 9. Nevertheless the criterion for perfect equalisation is that, if the two underloaded rollers were in fact equally loaded the geometry of FIGURE 2 would apply.

Figures 3, 3A, 3B:
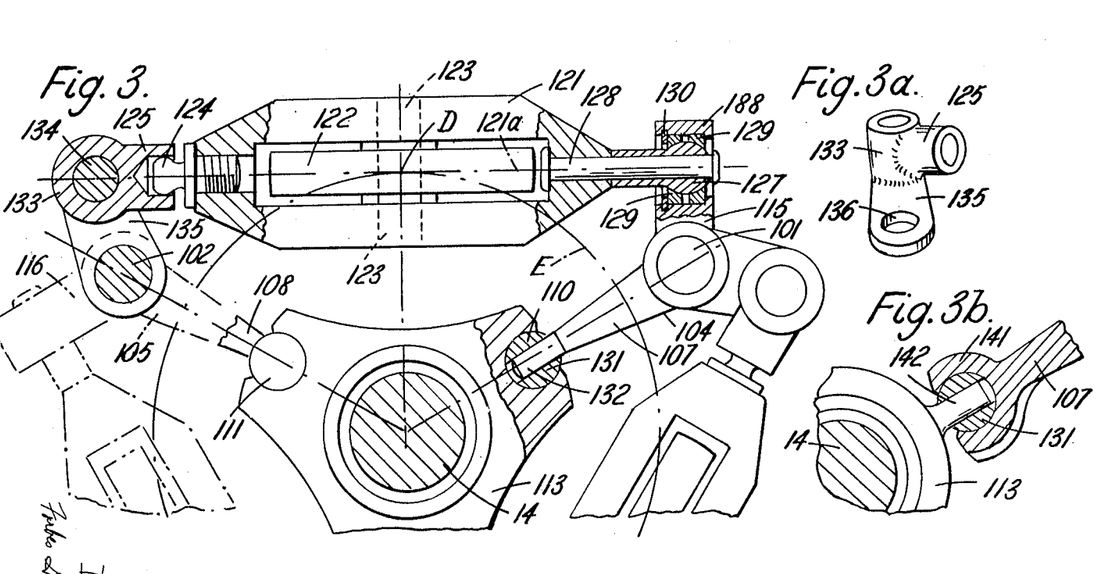
FIGURE 3 is a part sectional view of part of another transmission of the invention.
FIGURE 3a is a perspective view of a part of the transmission of FIGURE 3.
FIGURE 3b is a sectional view showing a modified detail of a transmission similar to that illustrated in FIGURE 3.

FIGURE 3 shows a part of a practical construction of a "camber angle" version of the invention of the type diagrammatically illustrated in FIGURES 1 and 2.

In this embodiment the swivelling joint 118 takes the form of a ball and socket joint, the ball element 127 being secured to the roller carrier 121 by means of an elongated rivet 128. The socket element 129 is in two halves, one of which is threaded over the ball element 127 before it is riveted to roller carrier 121. The two socket halves 129 rest in a recess in the end of rocker arm 115 and are secured therein by a spring retaining ring 130.

The mounting of the inner end of rocker arm 107 in the cam ring 113, at control point 110 differs from that shown in FIGURE 1. A cylindrical plug 131 rides in a part cylindrical recess in cam ring 113 and the inner end of rocker arm 107 is machined to the form of a cylindrical spigot 132 which rides in a transverse bore in plug 131. Damping means may be arranged to resist the movement of spigot 132 along the transverse bore in plug 131 to damp the load equalisation action resulting from bodily radial displacements of cam ring 113. With this arrangement the geometry of FIGURE 2 is not strictly adhered to since there is a slight change in the effective lengths of the rocker arms 107, 108 and 109 when the cam ring 13 is bodily displaced in a radial direction. The error thus introduced is, however, a second order effect and can be ignored in practice. It could be eliminated, of course, by mounting the plug 131 in a claw 141 at the end of rocker arm 107, and providing a projecting spigot 142 on cam ring 113 which rides in the transverse bore of plug 131 (as shown in FIGURE 3b).

At the left hand end of roller carrier 121, the plug 124 takes the form of a stud screwed into a threaded hole in carrier 121 and having a part-spherical knob projecting therefrom. Socket 125 is part of a unitary component having a boss 133, adapted to fit over a stud 134 anchored to the reaction plate (not shown), and a lug 135, having a hole 136 which engages pivot 102 to provide a second locating point. Rocker 105 is fitted on to pivot 102 over and relatively movable to the lug 135 which lug 135 forms a convenient spacing washer between the rocker pivot boss and the reaction plate.

A camber angle is obtained by displacing socket 125 and the ball socket 129 from, and on opposite sides of the plane of the torus centre circle. If pivot 101 is parallel to the disc rotational axis C and the axis of socket 125 is parallel to the plane of the torus centre circle E, the camber angle will remain unaltered in all control settings of rocker 104.

It may be desired to provide for a variation of camber angle at different tilt angles. This can be provided for by canting the axis of socket 125 so that it is slightly out of parallel with the plane of the torus centre circle E. This by itself would tend to shift the roller centre D away from the plane of the torus centre circle E, towards one disc and away from the other. This shifting can be avoided by a compensating tilt of pivot 101 from parallelism with the disc axis C, but this compensation might well not be necessary as the numerous clearances in the roller and roller carrier mountings would generally allow the roller 122 to take up its normal running position between the driving and driven discs.

With the arrangement shown in FIGURE 3 the locus of the roller centre D, in the course of control movements of rocker 104, is part of an ellipse the major axis of which is substantially parallel to the centre line 121a of the roller carrier 121, passing through its supported ends. This locus corresponds closely to the torus centre circle E, but here again it is not essential that this locus should exactly follow the torus centre circle since divergences therefrom are likely to be small in relation to the inevitable working clearances between interfitting parts of the roller, the roller carrier, and the roller carrier mountings.

The description above, relating to the mounting and control linkages for roller 122, applies mutatis mutandis to the other rollers and their mountings.

In many applications of a transmission of the type described, even when the direction of rotation of the discs remains constant, reversals of torque will take place; in automotive applications, for instance, when the engine is throttled back and the vehicle is "overrunning" the engine. When such a reversal of torque takes place the torque reaction borne by the roller carriers reverses direction. The roller carrier mountings must nevertheless be such that tilt angle remains under control of the cam ring or other common control member. The socket 129 in FIGURE 3 must therefore hold the ball 127 secure against both pushing and pulling forces. Being supported positively at the outer end of the rocker arm 115 the roller carrier 121 will not shift tangentially except to a very small extent required to take up working clearances (e.g. in the rocker pivot) so that there will be no substantial change of tilt angle and loss of equalisation on reversal of torque.

It should be realised that, though the torque reaction forces acting at the inner ends of the rockers change direction on a torque reversal, the relation between ratio angle and torque reaction also reverses so that, so long as the rollers do not have their tilt angles disturbed by substantial tangential shifting over, equalisation calls for the same relative ratio angles of the rollers whether on the drive or on the over-run.

Figure 4:
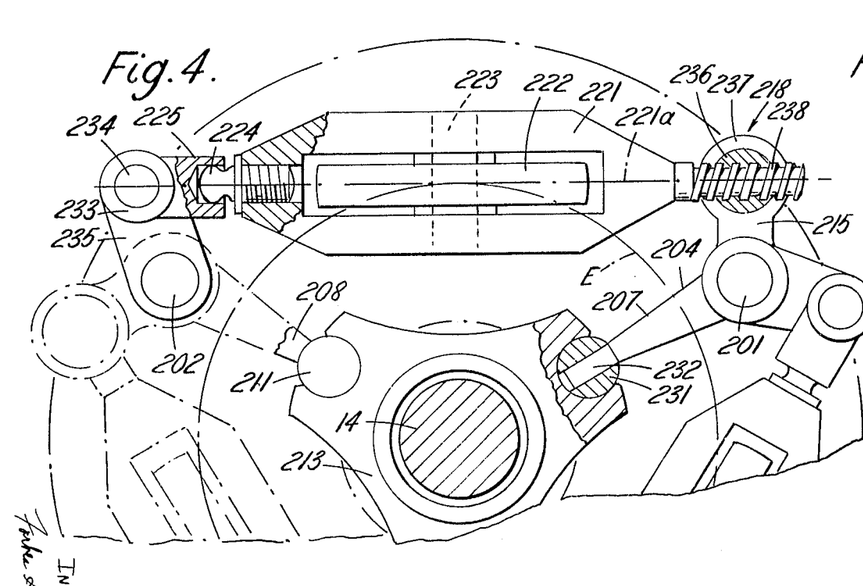
FIGURE 4 is a view similar to FIGURE 3 of a further transmission of the invention.

The construction shown in FIGURE 4 is very similar to that shown in FIGURE 3 and corresponding reference numerals have been used for corresponding items. The FIGURE 4 construction is, however, an example of the "tilt cancelling" method of ratio control.

The centre line of roller carrier 221, instead of being set at a camber angle as in FIGURE 3, lies in the plane of the torus centre circle E.

Figure 4A:
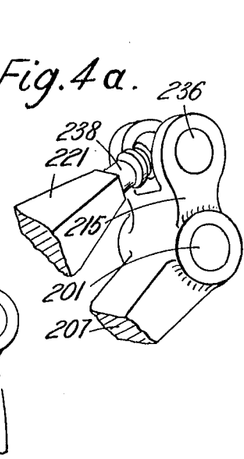
FIGURE 4a is a perspective view of a detail of FIGURE 4.

The swivel joint 218 at the tip of rocker arm 215 is replaced by a cylindrical plug 236 located in forked end 237 of arm 215, and free to rotate in the two limbs of the forked end 237 (see FIGURE 4a). Plug 236 is pierced with a transverse hole which is threaded to receive a threaded stalk 238, projecting from the right hand end of roller carrier 221 (which replaces the ball element 127 of FIGURE 3).

When rocker 204 is actuted to initiate a change of ratio, roller carrier 221 is shifted tangentially of the torus centre circle and assumes a tilt angle. The roller 222 then steers towards a different ratio angle and in doing so the threaded stalk 238 turns in plug 236 in a direction such as to move the roller carrier 221 back towards the central neutral tilt angle position in which it is shown in FIGURE 4. Rocker 204 remains displaced, however, and it will be appreciated that each position of rocker 204 will be uniquely associated with a particular ratio angle of the roller 222. If the load is unequally distributed between the rollers—roller 222, for instance, being more heavily loaded than the others, the excess torque reaction will shift rocker arm 215 to the right, a tilt angle will again be imparted to roller 222, and it will move to a lower ratio angle which will again rotate stalk 238 to screw roller carrier 221 back to the central neutral tilt angle position. The movement to the right of rocker arm 215 will cause the rocker 204 to rock about pivot 201 causing the cam ring 213 to carry out equalising movements similar to those carried out by the cam rings in the preceding embodiments.

Thus it can be seen that the construction of FIGURE 4 gives a tilt cancelling arrangement incorporating full balanced load equalisation.

Preferably the pitch angle of the thread on stalk 238 is chosen so that it is irreversible in the sense that end thrusts cannot cause the stalk 238 to turn in the plugs 236. This is not difficult to achieve since the movement required at forked end 237 of rocker arm 215 is very small. It is not essential however, for this thread to be irreversible because any tendency of stalk 238 to turn in response to end thrusts encounters the resistance of the rollers 222 to a change of ratio angle by forcible lateral movement in relation to their natural tracks on the discs, that is to say a change of ratio angle not brought about by a tilt angle. If indeed the stalk 238 were to be forced to the right in response to torque reaction thrust it would have to make a ratio angle change towards a higher ratio whilst at the same time the lateral displacement would produce a tilt angle tending towards a low ratio. The forces are thus in balance.

Figure 5:
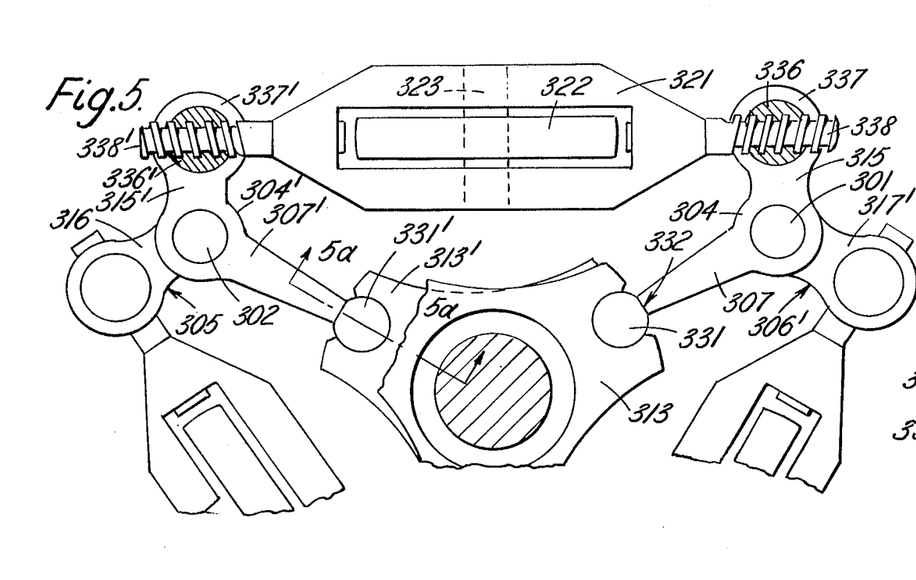
FIGURE 5 is a view similar to FIGURE 3 of yet a further transmission of the invention.
Figure 5A:
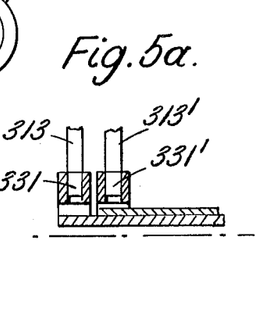
FIGURE 5a is a section on line 5a—5a of FIGURE 5.

The construction shown in FIGURE 5 is a modification of that shown in FIGURE 4 and permits rotation in both directions. It has two cam and rocker systems and during rotation one way, one cam and rocker system controls while the other idles. During rotation the other way, the other controls and the one idles.

In place of the sliding ball and socket support 224, 225 for the roller carrier 221, as used in the arrangement of FIGURE 4, a rocker arm 315' riding on the pivot 302, alongside rocker 305, is provided. The rocker arm 315' cooperates with the left hand end of roller carrier 321 in a manner which is virtually the mirror image of the arrangement supporting the right hand end of roller carrier 321. The components of this left hand rocker arm 315' assembly have accordingly been given the same reference numerals as corresponding items of the right hand assembly but the left hand numerals are primed.

With normal rotation of the transmission cam ring 313 is connected to the control mechanism and cam ring 313' is free from rotational restraint. When roller carrier 321 executes a ratio angle change consequent upon a clockwise movement of rocker 304, the other rocker 304' is caused to make an anti-clockwise movement since the thread 335' is a right hand thread. If, following an equalising movement of cam ring 313, the rollers make asymmetrical ratio angle changes, the inner ends of the rockers 304', 305' and 306' (rocker 305' being omitted from the drawing) execute asymmetrical movements which cause cam ring 313' to shift laterally in a manner which corresponds to the equalising movement of cam ring 313.

To enable the rotational direction of the transmission to be changed it is necessary to bring about a synchronised change-over of the control mechanism from engagement with cam ring 313 to engagement with cam ring 313'. Many suitable mechanisms for this are known to the art. This mechanism may be linked with the element of the transmission system as a whole which causes the reversed rotation (e.g. a forward/reverse gear shift) or it may be linked to a rotational direction sensing device.

Figure 6:
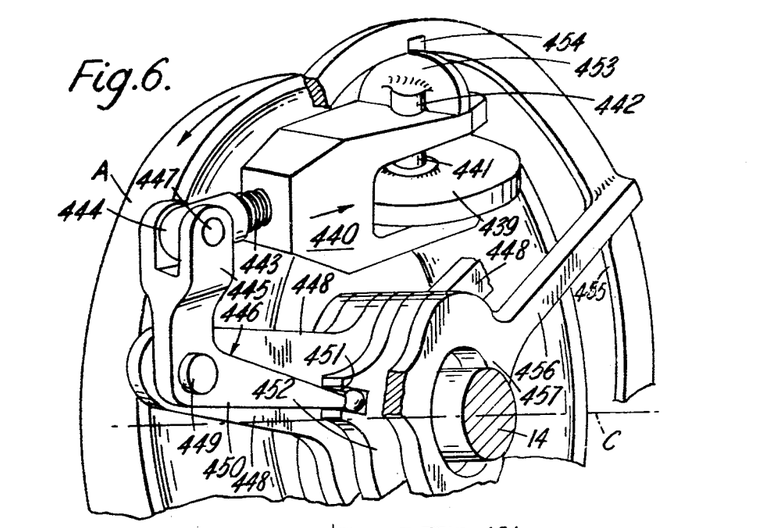
FIGURE 6 is a part perspective view of yet another transmission of the invention.

FIGURES 6 to 10 show an alternative embodiment of the invention in which the common control member and the common thrust receiving member are separate from one another. FIGURE 6 is a part perspective sketch of the embodiment of the invention with the driving disc (which would be rotating clockwise) removed to enable the roller and its mounting to be seen. The roller 439 is mounted in a roller carrier 440. The roller 439 has an integral shaft 441 projecting on both sides and riding in bearings 442 in roller carrier 440.

The roller carrier 440 is formed so that it allows considerable axial play for the roller 439. The end of the roller carrier 440 which is on the left in FIGURES 6 to 10, has a threaded hole into which a screwed rod 443 is inserted. Screwed rod 443 is integral with a knuckle 444 which is rotatably fixed in a jaw 445 of a rocker 446 by means of a pivot pin 447. Rocker 446 is in turn pivotally anchored to a fixed spider 448 by means of a pivot pin 449. A ball ended arm 450 of rocker 446 extends inwardly and engages a notch 451 in a central common thrust receiving member 452, the latter being restrained against rotation but capable of making limited movements in any radial direction. Roller carrier 440 is provided with an upwardly extending semi-circular web 453, the upper edge of which rides in a notch 454 in a ring 455 of a common control member supported by spider arms 456 from an inner ring 457 which is mounted so as to be capable only of rotation about the axis of the discs.

Figure 7:
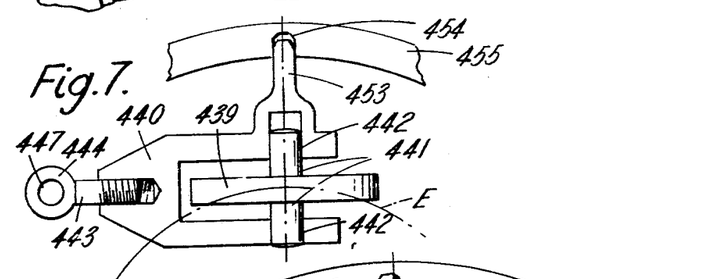
FIGURES 7, 8, 9 and 10 are detail views of a part of the transmission of FIGURE 6 during various conditions of operation of the transmission.
Figure 8:
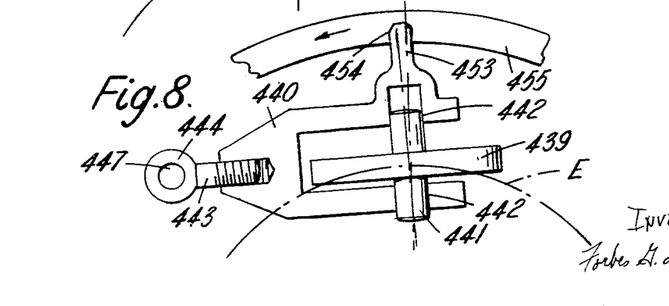
Figures 9, 10:
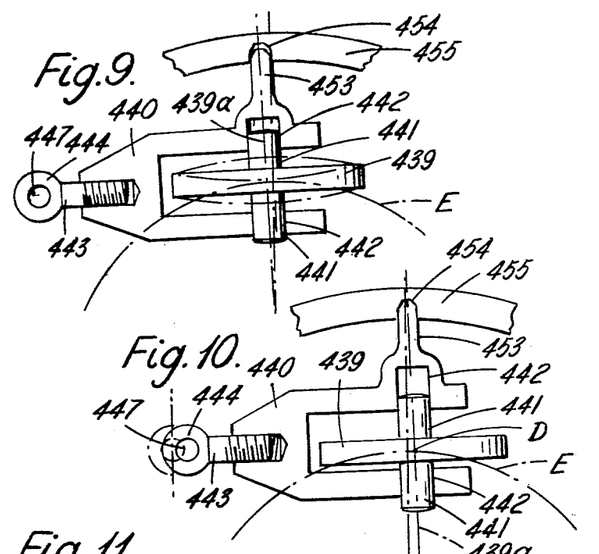

The method of operation can be seen from FIGURES 7 to 10. FIGURE 7 shows the roller carrier 440 in the centre position such as would give a 1:1 ratio. In FIGURE 8 the control ring 455 is moved anti-clockwise so that the roller carrier 440 pivots in an anti-clockwise direction about pivot pin 447 and it will be seen that the roller 439 undergoes a change of tilt angle tending to make it run to a lower ratio angle. As the roller carrier 440 must rise in the region of the bearings 442 to enable this tilt angle change to take place and as the roller 439 must continue to have its centre on the torus centre circle, the roller shaft 441 must slide downwardly in its bearings 442 in the roller carrier 440. As a result of the tilt angle shown in FIGURE 8 the roller undergoes a change of ratio angle as seen in FIGURE 9 and, as it turns the roller carrier 440 in the process, the roller carrier 440 screws itself along the screwed rod 443 and moves to the left, this time pivoting about the point of engagement of the semi-circular web 453 with the notch 454 in control ring 455. In the course of this movement on the part of the roller carrier 440 the centre of the roller is carried to the left until the roller axis 439a again intersects the axis C of the discs. The full lines in FIGURE 9 show the roller 439 and the roller carrier 440 still in the 1:1 position. In fact, of course, it will have undergone a ratio angle change in moving to the position shown in FIGURE 9 and the new position of the roller is shown in dotted lines.

The manner in which load equalisation between the rollers occurs can be seen from FIGURE 10. So long as the torque reaction thrusts against all the rollers are equal to one another the common thrust receiving member 452 is in a neutral central position. Suppose, however, that the roller 439 is carrying more load than the other rollers which other rollers are equally underloaded. The inner ball end of arm 450 will exert a larger force against the slot 451 than do the corresponding rocker arms associated with the other rollers and the common thrust receiving member 452 will execute a sideways motion in a direction substantially normal to a line running through the centre of pivot 449 and the ball end of arm 450, in a plane substantially parallel to the plane of the torus centre circle E. This will permit the pivot pin 447 to be displaced to the right to the position shown in full lines in FIGURE 10 in relation to its original position which is shown in dotted lines. The control ring 455 and its notch 454 will not change their positions and the result will be that the roller carrier 440 will pivot about the point of engagement of web 453 with notch 454 and in the process will undergo a tilt angle change tending to make roller 439 run to a lower ratio. The roller 439 is displaced to the right in the process and slides downwards in its bearings 442 to enable the roller centre D to remain on the torus centre circle E. As a result of this tilt angle change, roller 439 will steer itself into a lower ratio angle and the resulting ratio angle movement of roller carrier 440 will screw the latter to the left along the screwed rod 443 thus tending to bring the roller 439 back into the position in which it is shown in FIGURE 7 but with a slight change of ratio angle. The radial displacement of the common thrust receiving member 452 corresponding to the shift of pivot pin 447 causes equal and opposite movements on the part of the other roller carriers to move the centres of their rollers to positions corresponding to a leftward movement of roller 439 as seen in FIGURE 10. The geometry governing these movements of the other rollers is the same as that shown in FIGURES 1 and 2 so that the tilt angles imparted to the two equally underloaded rollers are aqual to one another and of opposite sense to the tilt angle change made by roller 439. The underloaded rollers thus undergo ratio angle changes in the direction of higher ratios and in the course of doing so screw themselves along the screwed rods corresponding to screwed rod 443 until the axes of the two underloaded rollers again intersect the axis of the discs. At the end of this equalisation operation the rollers have all adopted changed ratio angles such that they are carrying substantially equal torque reaction loads, the common thrust receiving member 452 remaining in the displaced position.

In this embodiment of the invention the common control member 455 is not subjected to torque reaction loads from the rollers, the torque reaction being supported by the fixed spider 448 via the rocker arms 446.

Various alternative roller carrier mountings may be used in the arrangements described with reference to FIGURES 3 and 4. For instance, the trailing end of the roller carriers may be supported by means of ball and socket joints on the ends of swinging links.

Figure 11:
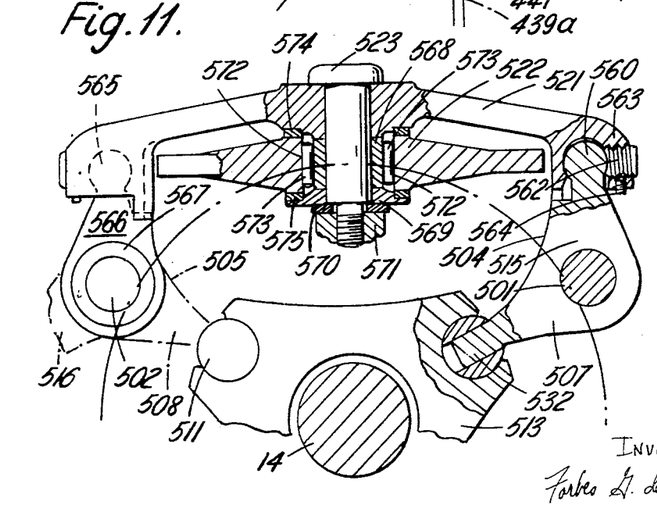
FIGURE 11 is a view similar to FIGURE 3 of still another transmission of the invention.

An arrangement of this type is shown in FIGURE 11, in which similar reference numerals as those used in FIGURE 3 have been used to denote corresponding items. In this arrangement arm 515 of rocker 504 terminates in a ball end 560 which cooperates with a hemispherical surface 561 integral with the roller carrier 521 and the hemispherical end of an adjusting screw 562. This adjusting screw 562 is screwed into an overhanging lip 563 of the roller carrier 521 and is locked in position by a transverse pin 564. An identical assembly at the other end of the roller carrier cooperates with the ball end 565 of a stub lever 566, mounted for independent rotation about pivot pin 502. Stub lever 566 may be carried on a sleeve 567 projecting axially from the rocker 505 which is shown in dotted lines in FIGURE 11. Stub lever 566 and rocker 505 are free to rotate independently of one another. However adjacent shoulders of the stub lever 566 and the rocker 505 determine the relative positions of the stub lever 566 and rocker 505 axially of the transmission and this facilitates the achievement of uniform camber angles for all the rollers of a set.

The roller carrier 521 is in the form of an arch extending outwardly over the roller 522, which is supported by means of a bolt 523 carrying a roller race 568 and end flange 569 which are locked against the roller carrier 521 by a washer 570 and a nut 571 which is screwed on to the threaded end of the bolt 523. The inner surface 572 of the central bore through roller 522 forms the outer race for needle rollers 573 which provide the rotational bearing for roller 522.

End washers 574 and 575 locate roller 522 axially of its bearing.

In yet another alternative arrangement two rockers, one at each end of the roller carrier have their inwardly extending arms coupled together by a link having a projecting lug or the like at some intermediate point along its length, this lug engaging a control point on the cam ring or other common control member.

The invention has been described above in relation to a transmission of the type described which has a single pair of discs. The invention is, of course, equally applicable to a transmission of this type having two pairs of discs, the outer two discs being driving discs co-operating through two sets of rollers with a central driven disc having an outwardly facing toroidal track on each side. The roles of the outer discs and the inner dual disc can of course be reversed. With this arrangement the two outer discs may be mounted on a single driving shaft extending through the centre of the transmission with an input-torque-controlled thrust device urging the two outer discs together to provide the loading required to ensure a driving action between the discs and the rollers. This enables a highly loaded thrust race to be dispensed with.

I claim:

1. A transmission of the type described comprising a carrier for each roller of a set of rollers engaging facing toroidal surfaces of a driving and a driven disc, each such carrier providing a bearing for the roller carried thereby permitting rotation of the said roller about an axis fixed in relation to the said roller carrier, locating means for each roller carrier providing two degrees of freedom of motion for the roller carrier namely freedom to rotate about an axis (hereinafter called the "ratio angle axis") which is normal to the rotational axis of the roller, which passes through the roller centre and which is contained in a plane inclined with respect to the plane containing the rotational axis of the discs and the roller centre, and freedom to undergo bodily displacement in the plane of the torus centre circle and substantially in the direction of the tangent to the torus centre circle at the roller centre (such bodily displacement being hereinafter called "tangential shift displacement"), the locating means restraining all other modes of motion of the roller carrier, in particular rotary motion about an axis passing through the zones of contact of the associated roller with the driving disc and the driven disc, whereby the ratio angle axis for any one attitude of the associated roller is substantially parallel to the ratio angle axis for any other attitude of such roller, a common thrust-receiving member having spaced-apart thrust-receiving points, one for each roller carrier, a coupling means for each roller carrier coupling that roller carrier at all times to one and the same thrust-receiving point, individual to that roller carrier, on the common thrust-receiving member and referring to that point at least part of the torque reaction thrust arising at the associated roller, the said coupling means restraining the roller carrier from tangential shift displacement in the absence of relative movement between the associated thrust-receiving point and the roller locating means and in the absence of rotation of the roller carrier about the ratio angle axis, the common thrust-receiving member being mounted for movement in a mode which permits tangential shift displacement of a different sense and of a different degree, as between one roller carrier and another, of the roller carriers associated with the rollers of the said set in response to inequality between the torque reaction thrust arising at such rollers whereby such rollers undergo ratio angle changes tending to equalise the torque reaction thrusts arising at all the rollers of the said set.

2. A transmission as claimed in claim 1 with adjustment means for the common thrust receiving member whereby it can be moved in a mode resulting in tangential shift displacements of all the roller carriers in the same sense and to substantially the same degree.

3. A transmission as claimed in claim 2 in which the common thrust receiving member is coaxial with the torus centre circle and is capable of rotary motion about its axis such motion constituting that mode of motion which results in bodily motions as aforesaid of all the roller carriers in the same sense and to substantially the same degree.

4. A transmission as claimed in claim 1, in which the forces leading to or resulting from bodily movement as aforesaid are applied to and by a roller carrier, respectively by and to the mounting for that roller carrier, at one end only of that roller carrier.

5. A transmission as claimed in claim 1 in which the common thrust receiving member is coaxial with the torus centre circle and is capable of motion in any direction radial of the axis, such motion constituting that mode of motion permitting one roller carrier to execute a tangential shift displacement in one sense and the other roller carriers to execute tangential shift displacements in the opposite sense.

6. A transmission as claimed in claim 1, in which each of the means coupling a roller carrier to a thrust-receiving point on the common thrust receiving member consists of a mechanical linkage arranged so that when the torque reaction forces applied to one roller exceed the torque reaction forces applied to the other rollers of the set and the latter forces are equal, the force applied to the common thrust receiving member tends to move it in the same direction as that taken by that part of the linkage associated with the most heavily loaded roller which is in immediate engagement with the common thrust receiving member whereby the tangential shift displacements imparted to the said other rollers as a result of the motion so imparted to the common thrust receiving member are substantially equal to one another and of opposite sense with respect to the tangential shift displacement undergone by the most heavily loaded roller.

7. A transmission as claimed in claim 1, having a common control member, a coupling from each roller carrier to the common control member, a mounting for the common control member permitting the same to execute motions in a mode which results in tangential shift displacements in the same sense and substantially to the same degree on the part of all the roller carriers.

8. A transmission as claimed in claim 1 in which each roller carrier and its associated coupling means and thrust-receiving point cooperate in such a manner that, on execution of a tangential shift displacement by the roller carrier, the resulting change of ratio angle causes relative movement between the roller carrier and the thrust receiving point tending to cancel the said tangential shift displacement.

9. A transmission as claimed in claim 8, in which the means for producing the said relative movement between a roller carrier and its associated thrust-receiving point comprises cooperating screw threads on the roller carrier and the coupling means respectively which rotate relative to one another when the roller carrier executes a chang of ratio angle.

10. A transmission of the type described having a carrier for each roller of a set of rollers engaging facing toroidal surfaces of a driving disc and a driven disc such carrier providing a bearing for the roller carrier thereby permitting rotation of the roller about an axis fixed in relation to the roller carrier, support means for each roller carrier comprising a separate member individual to that roller carrier coupling the associated roller to a common thrust receiving member whereby at least part of the torque reaction thrust arising at a roller is referred to the said common thrust receiving member, the said support means being adapted to permit rotation of the roller carrier about an axis (hereinafter called the "ratio angle axis") which is normal to the rotational axis of the associated roller, which passes through the roller centre and which is contained in a plane inclined with respect to the plane containing the rotational axis of the discs and the roller centre, the coupling member of the support means being mounted for motion resulting in bodily displacement of the roller carrier in the plane of the torus centre circle and substantially in the direction of the tangent to the torus centre circle at the roller centre (such bodily displacement being hereinafter called "tangential shift displacment"), such support means, however, substantially restraining the roller carrier from rotation about an axis passing through the zones of contact of the associated roller with the driving disc and the driven disc, such support means further, restraining relative displacement, in the tangential shift sense, between the roller carrier and the coupling member of the support means in the absence of a ratio angle change on the part of the associated roller, the common thrust-receiving member being connected, at positions angularly spaced-apart from one another around the said member, to the coupling members of the respective support means associated with all the rollers of a set engaging facing toroidal surfaces of a driving and a driven disc whereby at least part of the torque reaction thrust arising at each roller of the set is at all times referred, to the common thrust receiving member, via the roller carrier and one and the same support means coupling member individual to that roller carrier, the common thrust-receiving member being free to move in a mode permitting tangential shift displacement of different sense as between one roller carrier and another of the set, in response to unequal torque reaction thrusts arising at the associated rollers, such differential tangential shift displacements being in such senses and of such magnitude as to bring about differential ratio angle changes on the part of the rollers tending to equalise the torque reaction thrusts at all the rollers.

11. A transmission as claimed in claim 10, in which the support means for a roller carrier comprises a lever jointed at one end to one end of the roller carrier and at the other end to the common thrust receiving member and a fixed fulcrum for the lever between its said ends and a swinging link jointed at one of its ends to the other end of the roller carrier and at its other end a fixed fulcrum coaxial with the fixed fulcrum for the lever of an adjacent roller carrier mounting the said lever constituting the coupling member of the support means, the relative axial positions of the swinging link and the lever of the said adjacent roller carrier mounting being determined by abutting faces of the said link and lever respectively.

12. A transmission as claimed in claim 10, in which the coupling member of the support means for each roller carrier is in the form of a lever pivoted on a fixed fulcrum and having one arm extending outwardly from the fulcrum to a swivel coupling with one end of the associated roller carrier and another arm extending inwardly from the fulcrum to a point of engagement on the common thrust receiving member.

13. A transmission as claimed in claim 12, in which the inwardly extending arm of each of the said levers terminates in a part which penetrates within an aperture in the periphery of the common thrust receiving member.

14. A transmission as claimed in claim 12, in which the centre line of the outwardly extending arm of each of the said levers is normal to the line passing through the pivotal centre of the swivel coupling and the centre of the associated roller at some point within the range of movement of which the said mounting is capable.

15. A transmission of the type described having a roller carrier for each roller of a set of rollers in driving engagement between a single surface on a driving disc and a single surface on a driven disc; locating means for each roller carrier, which locating means is capable of motion resulting in bodily movement of the associated roller carrier, such bodily movement having a substantial component in a direction tangential to the torus centre circle and resulting in tilt angle changes of the roller carrier; a common thrust receiving member; and a coupling between the said member and each of the said locating means, the said member being adapted to support torque reaction forces acting upon the rollers but being capable, in response to unequal torque reaction forces applied to it by the locating means, of motion in a mode permitting each roller carrier in respect of which there is a difference between the torque reaction force acting thereon and the mean value of the torque reaction forces acting on all the roller carriers, consequent upon bodily movement as aforesaid to execute a tilt angle change such as to initiate a ratio angle change in the sense tending to reduce the said difference, the sole path for the transmission of bodily movement as aforesaid of any one roller carrier to any other roller carrier being the path through the locating means of that one roller carrier, the common thrust receiving member, and the locating means of that other roller carrier, and each of the locating means restrains the roller carrier from executing bodily movements as aforesaid in the absence of movements on the part of the common thrust receiving member in the event of a change of direction of the torque reaction forces applied to the roller carrier, except to the extent associated with inevitable working clearances between interfitting parts of the locating means and its points of connection to the roller carrier and the common thrust receiving member.

16. A transmission as claimed in claim 15, in which each roller carrier is joined to its mounting by means of a swivel joint adapted to restrain relative movement between the two in either direction along a line tangential to the torus centre circle and passing through the roller centre but permitting limited relative rotation between the two in any plane.

17. A transmission as claimed in claim 16, in which the swivel joint comprises a ball end on the extremity of the roller carrier mounting and part-spherical bearing surfaces on the roller carrier.

18. An infinitely variable transmission comprising: coaxial driving and driven torus discs; a plurality of rollers drivably connecting the said torus discs; a carrier for each roller, each said carrier comprising means supporting the associated roller for rotation about a rotation axis fixed relative to the said carrier; a thrust receiving member capable of a symmetrical non-rotational movement about the common axis of the torus discs; first and second support means supporting each carrier for rotation about a swivel axis at right angles to the said rotation axis, all the first support means being connected to the thrust receiving member at spaced locations; and a plurality of mounting means fixed relative to the axis of the torus discs, each said mounting means carrying for independent relative pivoting movement the first support means for one carrier and the second support means of a carrier adjacent the said one carrier.

19. A transmission as claimed in claim 18 further comprising screw threaded connecting means connecting each said first support means to the associated carrier.

20. A transmission as claimed in claim 18 further comprising means connecting each said first support means to the carrier supported thereby to prevent translational movement between the said first support means and the rotation axis of the roller carried by the aforesaid carrier.

21. A transmission as claimed in claim 20, wherein the connecting means is comprised by a ball and socket.

22. A transmission comprising: a pair of coaxial torus discs; a member surrounding and capable of radial movement relative to the axis of the torus discs; fixed means fixed relative to the axis of the torus discs; a plurality of roller carriers; a plurality of rollers drivably connecting the torus discs and carried respectively by the said roller carriers for rotation about rotation axes fixed relative to the roller carrier; a number of support means carried by the said fixed means to allow relative movement thereof and themselves carrying the roller carriers; and a plurality of separate connecting means relatively operatively connected to the rollers to prevent relative translational movement of the associated rollers, said connecting means being operatively connected to the said member at spaced locations on the said member and each of the said connecting means being movable relative to all the support means or the rollers to which it is not connected.

23. A transmission as claimed in claim 22 wherein the line drawn between the points of connection between a carrier and its support means is inclined at approximately right angles to the line joining the point of connection between the said carrier and one of the support means thereof and the point of support of the said support means on its associated fixed member.

References Cited in the file of this patent
UNITED STATES PATENTS

| | | |
|---|---|---|
| 1,865,102 | Hayes | June 28, 1932 |
| 1,868,234 | Hunt | July 19, 1932 |
| 2,140,012 | Hayes | Dec. 13, 1938 |